United States Patent

Kamiya et al.

[11] Patent Number: 5,131,613
[45] Date of Patent: Jul. 21, 1992

[54] CABLE TIE

[75] Inventors: Haruhisa Kamiya, Okazaki; Mitsunori Hasebe, Utsunomiya, both of Japan

[73] Assignees: Daiwa Kasei Kogyo Kabushiki Kaisha, Aichi; Sumitomo Denso Kabushiki Kaisha, Mie, both of Japan

[21] Appl. No.: 685,657

[22] Filed: Apr. 16, 1991

[30] Foreign Application Priority Data

Apr. 27, 1990 [JP] Japan ................ 2-46025[U]

[51] Int. Cl.⁵ ............................................. F16L 3/08
[52] U.S. Cl. ............................ 248/74.3; 24/16 PB; 248/71
[58] Field of Search ........... 248/74.3, 74.2, 74.1, 248/71, 73; 24/16 PB, 17 AP

[56] References Cited

U.S. PATENT DOCUMENTS

| | | | |
|---|---|---|---|
| 4,183,119 | 1/1980 | Stewart et al. | 24/16 PB |
| 4,236,280 | 12/1980 | Kreiseder | 24/16 PB |
| 4,865,281 | 9/1989 | Wollar | 248/71 |
| 4,875,647 | 10/1989 | Takagi et al. | 248/74.3 |
| 4,919,373 | 4/1990 | Caveney et al. | 248/74.3 |
| 4,944,475 | 7/1990 | Ono et al. | 248/74.3 X |

FOREIGN PATENT DOCUMENTS 57-143161  9/1982  Japan .
57-190107  11/1982  Japan .

*Primary Examiner*—Ramon O. Ramirez
*Attorney, Agent, or Firm*—Dennison, Meserole, Pollack & Scheiner

[57] ABSTRACT

A cable tie including a belt member and a buckle member connected to one end of the belt member. The buckle member has a grooved supporting portion integrally formed thereon and having a pair of upper surfaces. The buckle member is also formed with a pair of receiving surfaces which cross to the upper surfaces of the supporting portion at an obtuse angle, respectively. The supporting portion is formed with an engagement leg at a lower surface thereof.

8 Claims, 3 Drawing Sheets

CABLE TIE

BACKGROUND OF THE INVENTION

The present invention relates to a cable tie to clamp a wire bundle such as a wiring harness and to fix the same on the body panel of an automobile and the like, and more particularly, the invention relates to a cable tie comprising a belt member and a buckle member.

A conventional cable tie is found in, for example, Japanese Laid-Open Patent Publication No. 57-190107. As shown in FIG. 5, the prior art cable tie comprises a belt member A1 and a buckle member B1 connected to one end of the belt member A1 which are integrally formed as a unit. The lower surface of the buckle member B1 is formed with an engagement leg C1 which is configured to be insertable into an aperture D1 formed on a base plate E such as a body panel of an automobile. The cable tie is secured to the base plate E by inserting the engagement leg C1 into the aperture D1 on the base plate E. The belt member A1 of the cable tie is looped directly about a wire bundle W, thereby to fix the wire bundle W on the base plate E.

A problem usually associated with the prior art cable tie as described in Japanese Publication No. 57-190107 is that a gap G is formed between the belt member A1 and the wire bundle W because of the existence of the buckle member B1. Therefore, the wire bundle W is not stably fastened.

Another problem usually associated with the prior art cable tie as described in Japanese Publication No. 57-190107 is that the wire bundle W is not sufficiently stably fixed on the base plate E because the wire bundle W is substantially supported only by the belt member A1 looped thereabout. Therefore, the wire bundle W has a rolling motion caused by vibration of the base plate E, which tends to destroy the wire bundle W, the cable tie or other members positioned near the wire bundle W.

A further problem usually associated with the prior art cable tie is that the distance is great between the clamped wire bundle W and the surface of the base plate E because the wire bundle W is supported on the buckle member B1. Therefore, large space is required to position the wire bundle W on the base plate E.

Japanese Laid-Open Utility Model Publication No. 57-143161 teaches a cable tie which may minimize such problems. As shown in FIG. 6, the prior art cable tie comprises a belt member A2 and a buckle member 82 wherein an engagement leg C2 is provided on the belt member A2 in place of the buckle member B2 to decrease the distance between the wire bundle W and the base plate E when the wire bundle W is clamped by the belt member A2.

The cable tie described in Japanese Laid-Open Utility Model Publication No. 57-143161 effectively eliminates the third problem associated with the cable tie described in the Publication No. 57-190107 but does not yet eliminate the first and second problems associated with the cable tie described in the Publication No. 57-190107. Further, such a cable tie includes a new Problem that a user can not sufficiently pull the free end of the belt member A2 to fasten the wire bundle W tightly because the base Plate E prevents travel of the belt member A2. This results from the specific arrangement that the belt member A2 of the cable tie has to be inserted into an insertion opening of the buckle member B2 in such a way that the free end of the belt member A2 faces to the base plate E.

SUMMARY OF THE INVENTION

It is an object of the invention to provide a cable tie to clamp a wire bundle and the like which can stably fix the wire bundle on a base plate to effectively prevent the rolling motion of the wire bundle even when the base plate is vibrated.

It is another object of the invention to provide a cable tie to clamp a wire bundle and the like which does not require large space to position the wire bundle.

It is a further object of the invention to provide a cable tie to clamp a wire bundle and the like which has excellent ease of handling for sufficiently fastening the wire bundle.

According to the present invention, there is provided a cable tie which comprises a belt member to be looped about a wire bundle such as a wiring harness and a buckle member connected to one end of the belt member. The buckle member has an insertion opening into which the belt member can be inserted and has an engagement lip projected into the insertion opening. The engagement lip has an engagement projection engageable with teeth formed on the belt member. The buckle member further comprises a supporting portion integrally formed thereon and laterally extending from an entrance side thereof, the supporting portion being formed with a groove adapted to guide the belt member and having a pair of upper surfaces; a pair of receiving surfaces formed thereon and extending from the upper surfaces of the supporting portion at an obtuse angle; and an engagement leg formed on a lower surface of the supporting portion for securing the buckle member on a base plate such as an automobile body, whereby the wire bundle is supported on the upper surfaces of the supporting portion as well as the receiving surfaces and is stably fixed on the base plate when the wire bundle is clamped by the belt member.

An important feature of the present invention is that the wire bundle is effectively supported on the upper surfaces of the supporting portion and the receiving surfaces of the buckle portion when it is clamped by the belt member, thereby offering the advantage that the wire bundle is stably fixed on the base plate to effectively prevent rolling motion thereof caused by vibration of the base plate.

Another feature of the present invention is that the wire bundle is positioned near the base plate, thereby offering the advantage that only small space is required to position the wire bundle on the base plate.

A further feature of the present invention is that the leading end of the belt member is moved parallel to the base plate when it is pulled to fasten the wire bundle, thereby offering the advantage that a user can easily fasten the wire bundle.

The present invention will become more fully apparent from the claims and the description as it proceeds in connection with the drawings.

DETAILED DESCRIPTION OF THE PREFERRED EMBODIMENT

Figure 1:
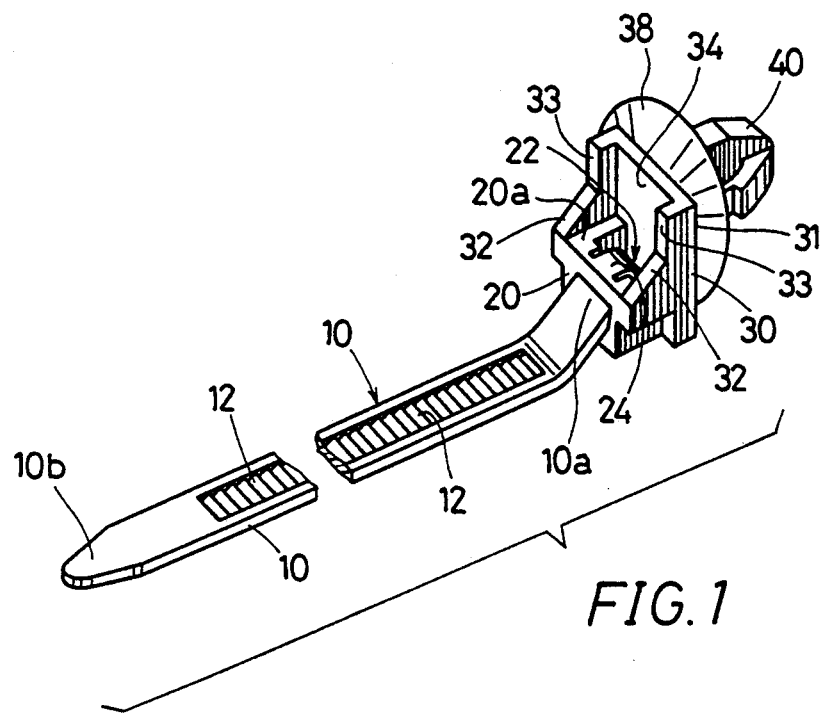
FIG. 1 is a perspective view of a cable tie according to a first embodiment of the present invention.
Figure 2:
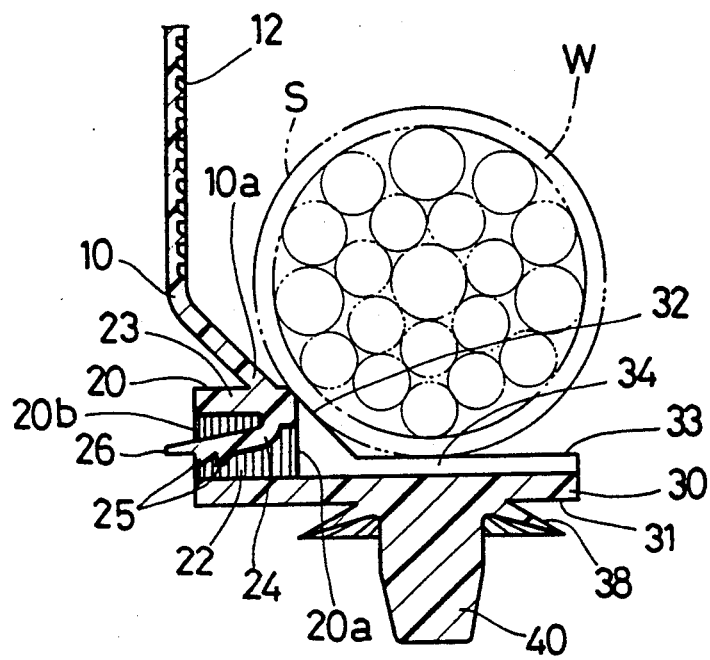
FIG. 2 is a sectional view of a portion of the cable tie.
Figure 3:
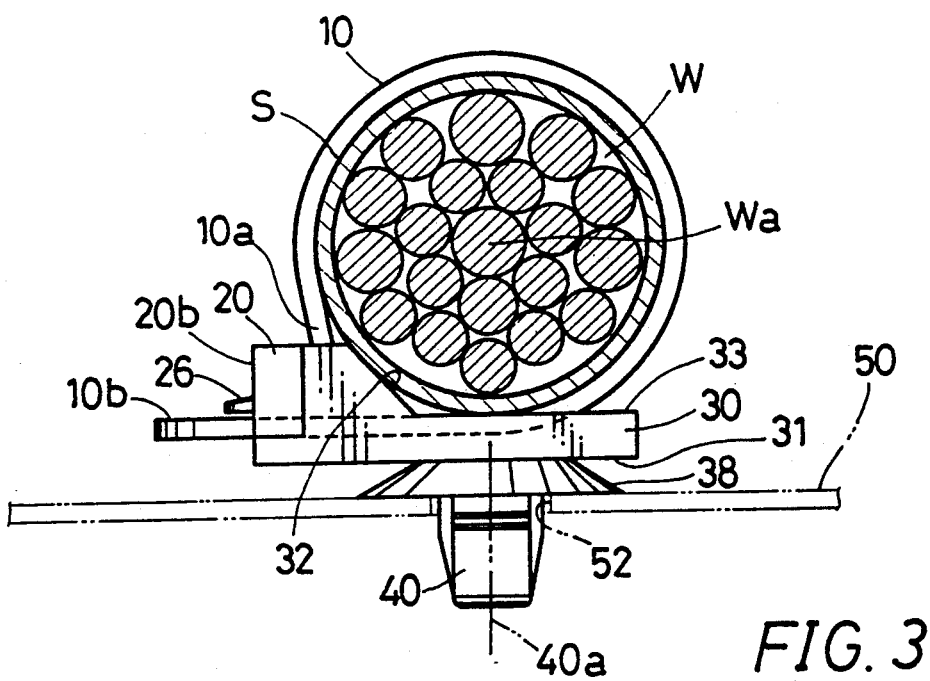
FIG. 3 is a side view of the cable tie which is in use.
Figure 5:
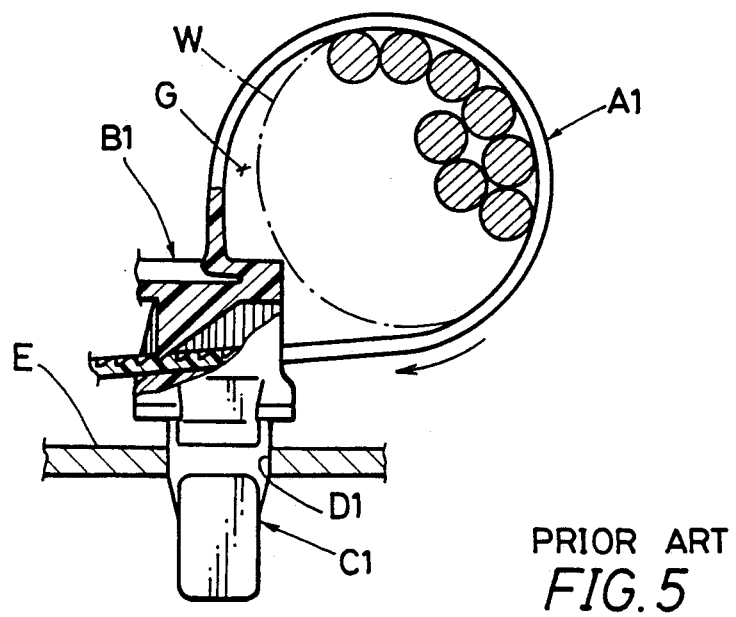
FIG. 5 is a side view of a prior art cable tie which is in use.
Figure 6:
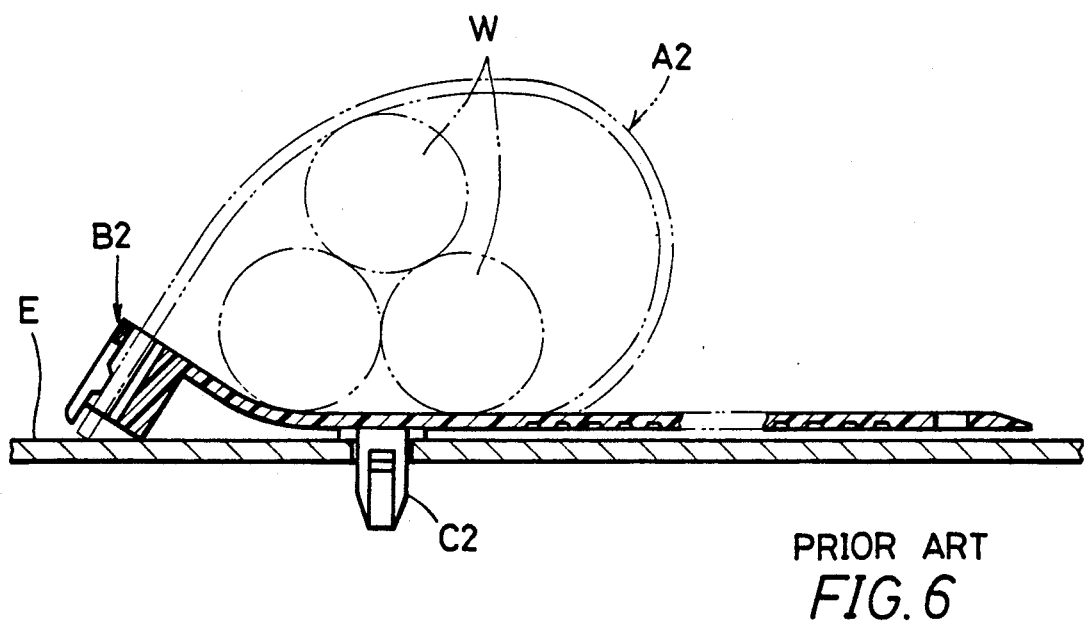
FIG. 6 is a side view of another prior art cable tie which is in use.

Referring now to FIGS. 1 to 3, shown therein is a cable tie according to a first embodiment of the present invention.

As best shown in FIG. 1, the cable tie comprises a belt member 10 and a buckle member 20 connected to one end 10a of the belt member 10. The belt member 10 and the buckle member 20 are integrally formed as a unit and are preferably formed of resilient synthetic resin.

As shown in FIGS. 1 to 3, the buckle member 20 is formed with an insertion opening 22 which is configured to receive the belt member 10 and which extends from an entrance side 20a to an exit side 20b of the buckle member 20. The buckle member 20 is also formed with a pair of inclined receiving surfaces 32. The buckle member 20 includes a supporting portion 30 integrally formed thereon. The supporting portion 30 laterally extends from the entrance side 20a of the buckle member 20 and is formed with a groove 34 aligned with the insertion opening 22. The supporting portion 30 has a planar lower surface 31 and a pair of upper surfaces 33 parallel to the lower surface 31. The upper surfaces 33 extend from the receiving surfaces 32 at an obtuse angle greater than 90°, respectively. As will be easily understood, the receiving surfaces 32 and the upper surfaces 33 cooperate with each other to receive a wire bundle W such as an wiring harness thereon.

As shown in FIG. 2, the buckle member 20 has an engagement lip 24 projected into the insertion opening 22 thereof. The engagement lip 24 is integrally formed on an upper wall 23 of the buckle member 20 and is diagonally extended toward the exit side 20b of the buckle member 20 so as to permit vertical flexure. The engagement lip 24 is integrally formed with engagement projections 25 each of which is downwardly projected. The engagement lip 24 is also integrally formed with a tongue 26 projected from the exit side 20b of the buckle member 20 over a desired length.

As best shown in FIGS. 1 and 2, the belt member 10 is integrally connected to the upper wall 23 of the buckle member 20 at a proximal end 10a thereof. The belt member 10 has a distal end or leading end 10b from which the belt member 10 is introduced into the insertion opening 22 and longitudinally has a series of teeth 12 on one side thereof. Each of the teeth 12 is configured to permit the insertion of the belt member 10 into the insertion opening 22 but to prevent the drawing out of the belt member 10 from the insertion opening 22, that is, configured to engage with the projection 25 only when the belt member 10 is pulled back.

As shown in FIGS. 1 to 3, the lower surface 31 of the supporting portion 38 is integrally formed with a dish-shaped member 38 having an engagement leg 40 formed centrally thereon. The engagement leg 40 is configured to be insertable into an aperture 52 formed on a base plate 50 such as a body panel of an automobile. The dish-shaped member 38 and the engagement leg 40 are positioned so that a central axis Wa of the wire bundle W substantially intersects to an axis 40a of the engagement leg 40 when the wire bundle W is tightly bound by the belt member 10 (FIG. 3). The dish-shaped member 38, when the engagement leg 40 is completely inserted into the aperture 52 of the base plate 50, is adapted to stick on the upper surface of the base plate 50 for stabilizing the cable tie.

The operation of the cable tie thus constructed will now be explained with reference to the drawings.

The engagement leg 40 is firstly inserted into the aperture 52 of the base plate 50 to position the cable tie on the base plate 50. The wire bundle W is seated on the upper surfaces 33 of the supporting portion 30 in such a way that the outer surface S thereof partly contacts the receiving surfaces 32 of the buckle member 20. Thereafter, the belt member 10 is looped about the wire bundle W. The looped belt member 10 is led along the groove 34 of the supporting portion 30 and is inserted into the insertion opening 22 from the entrance side 22a. The insertion procedure of the belt member 10 is continued until the leading edge 10b thereof is projected from the exit side 20b over a desired length. The leading edge 10b projected from the exit side 20b is subsequently pulled to fasten the wire bundle W, thereby providing a clamping condition of the wire bundle W (FIG. 3). This clamping condition is effectively kept because the engagement projections 25 of the engagement lip 24 and the teeth 12 of the belt member 10 are constructed as above.

As shown in FIG. 3, the wire bundle W is supported substantially on the upper surfaces 33 of the supporting portion 30 and the receiving surfaces 32 of the buckle member 20 when the wire bundle W is clamped by the belt member 10. Therefore, the wire bundle W is stably fixed on the base plate 50 to effectively prevent rolling motion thereof caused by vibration of the base plate 50. Also, the wire bundle W is positioned near the base plate 50, thereby to effectively minimize space required to position the wire bundle W on the base plate 50. Further, the leading end 10b of the belt member 10 moves parallel to the base plate 50 when the leading end 10b is pulled to fasten the wire bundle W. Therefore, the base plate 50 does not prevent travel of the belt member 10, thus permitting a user to easily fasten the wire bundle W.

To release the clamping condition of the wire bundle W, the tongue 26 of the engagement lip 24 is lifted up to disengage the projections 25 of the engagement lip 24 from the teeth 12 of the belt member 10, thereby to permit drawing out of the belt member 10 from the insertion opening 22.

As will be easily understood, the clamping procedure of the wire bundle W can be performed before the engagement leg 40 is inserted into the aperture 52 of the base plate 50 to secure the cable tie with the wire bundle W on the base plate 50, if desired.

Figure 4:
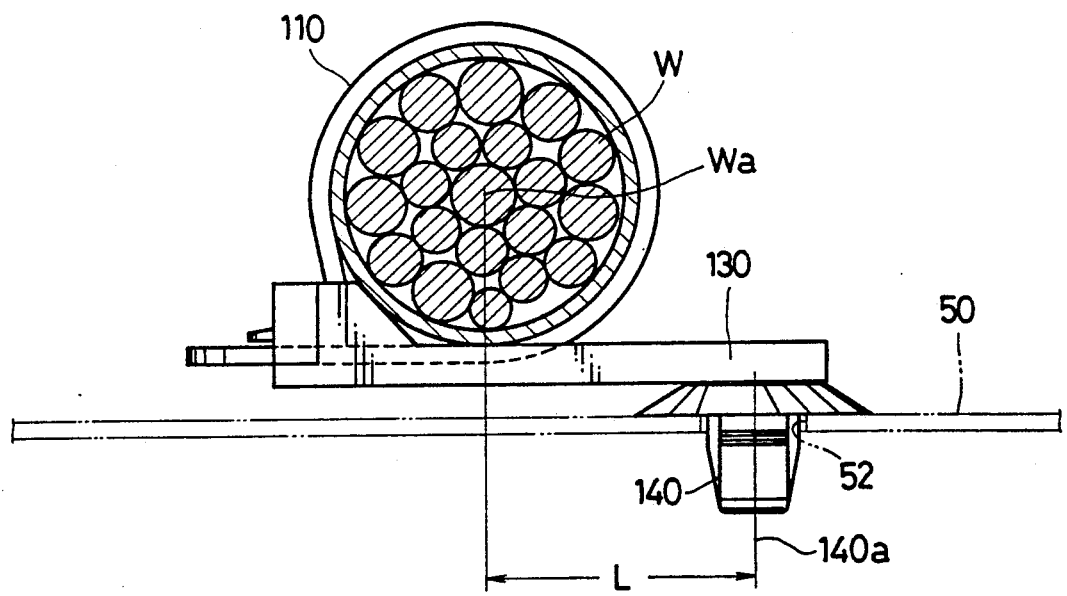
FIG. 4 is a side view of a cable tie according to a second embodiment of the present invention which is in use.

A second embodiment modified from the first embodiment of the present invention will now be described with reference to FIG. 4, wherein only parts different from those shown in FIGS. 1 to 3 will be explained.

A supporting portion 130 is longitudinally extended so that the central axis Wa of the wire bundle W is apart from the axis 140a of a engagement leg 140 at a distance L when the wire bundle W is clamped by the belt member 110.

In this modified construction, the wire bundle W can be positioned apart from the aperture 52 of the base plate 50. Therefore, such a construction will be preferable in a case that the aperture 52 can not be formed on a desired position on the base plate 50 on which the wire bundle is to be positioned.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A cable tie comprising a belt member to be looped about a wire bundle such as a wiring harness and a buckle member connected to one end of said belt member, said buckle member having an entrance side and an exit side, and an insertion opening into which said belt member can be inserted and having an engagement lip projected into said insertion opening, said engagement lip having an engagement projection engageable with teeth formed on said belt member, the improvement in said buckle member comprising:

a supporting portion integrally formed on said buckle member and extending laterally outward from said entrance side of said buckle member for reception of a wire bundle thereon laterally outward of said entrance side, said supporting portion being formed with a groove adapted to guide said belt member and having a pair of upper surfaces for support of a received wire bundle;

a pair of receiving surfaces formed on said buckle member and extending linearly from the upper surfaces of said supporting portion at an obtuse angle and for the full height of said entrance side;

said one end of said belt member being connected with said buckle member laterally inwardly offset from said entrance side; and an engagement leg formed on a lower surface of said supporting portion laterally outward of said entrance side for securing said buckle member on a base plate such as an automobile body, whereby the wire bundle, when clamped by said belt member, necessarily contacts said upper surfaces of said supporting portion as well as said receiving surfaces so as to be stably supported on said upper surfaces and receiving surfaces.

2. The cable tie as defined in claim 1, wherein said buckle member and said belt member are integrally formed as a unit.

3. The cable tie as defined in claim 2, wherein said engagement lip is formed with a tongue projected from said exit side of said buckle member.

4. The cable tie as defined in claim 3, wherein said engagement leg is positioned so that an axis of said engagement leg intersects to an axis of a wire bundle when the wire bundle is received on said supporting portion and encircled by said belt member.

5. The cable tie as defined in claim 3, wherein said engagement leg is positioned so that an axis of said engagement leg is laterally outward of an axis of a wire bundle, relative to said entrance side, when the wire bundle is received on said supporting portion and encircled by said belt member.

6. A cable tie adapted to mount to a plate aperture and support a wire bundle laterally remote from said aperture, said cable tie comprising a belt member to be looped about a wire bundle such as a wiring harness and a buckle member connected to one end of said belt member, said buckle member having an entrance side and an exit side, and an insertion opening into which said belt member can be inserted and having an engagement lip projected into said insertion opening, said engagement lip having an engagement projection engageable with teeth formed on said belt member, the improvement in said buckle member comprising:

a supporting portion integrally formed on said buckle member and extending laterally outward from said entrance side of said buckle member and defining an area for reception of a wire bundle thereon immediately adjacent said buckle member, said supporting portion extending substantially beyond the wire bundle receiving area and being formed with a groove adapted to guide said belt member and having a pair of upper surfaces for support of a received wire bundle;

a pair of receiving surfaces formed on said buckle member and extending linearly from the upper surfaces of said supporting portion at an obtuse angle;

an engagement leg formed on a lower surface of said supporting portion for securing said buckle member to an engagement aperture formed on a base plate such as an automobile body, said engagement leg being positioned outward of said wire bundle receiving area with said engagement leg defining an axis laterally spaced from an axis defined by said wire bundle when the wire bundle is clamped by said belt member, said wire bundle, when clamped by said belt member, contacting said upper surfaces of said supporting portion and said receiving surfaces so as to be stably supported on these surfaces and positioned apart from said engagement aperture on said base plate.

7. The cable tie as defined in claim 6 wherein said buckle member and said belt member are integrally formed as a unit.

8. The cable tie as defined in claim 7 wherein said engagement lip is formed with a tongue projected from said exit side of said buckle member.

* * * * *